A. STECKER.
VEHICLE LIFTING JACK.
APPLICATION FILED APR. 20, 1917.
1,252,048.
Patented Jan. 1, 1918.
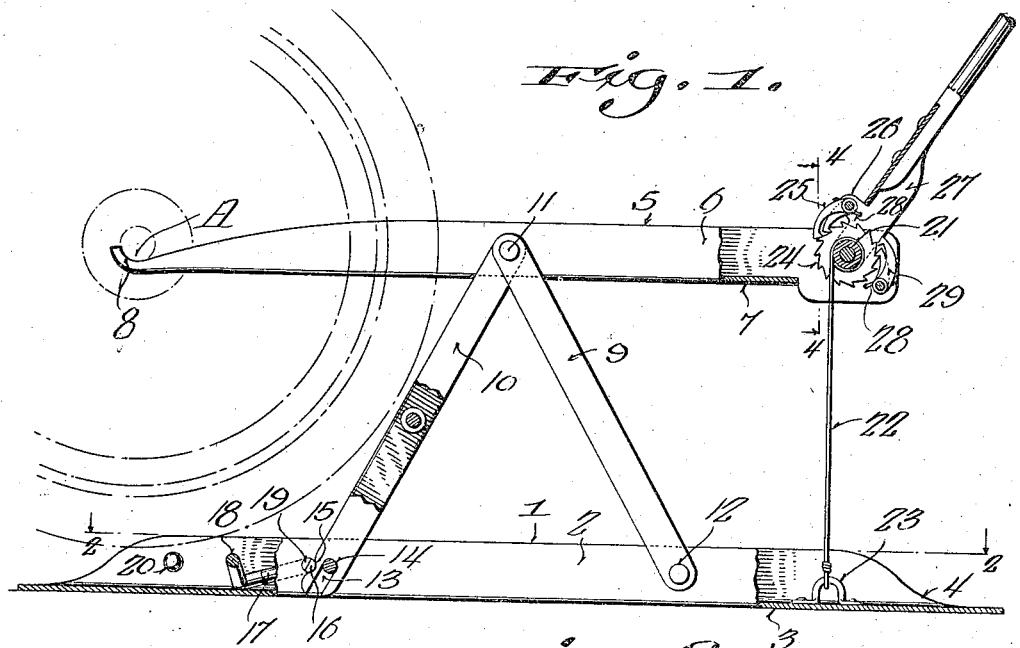
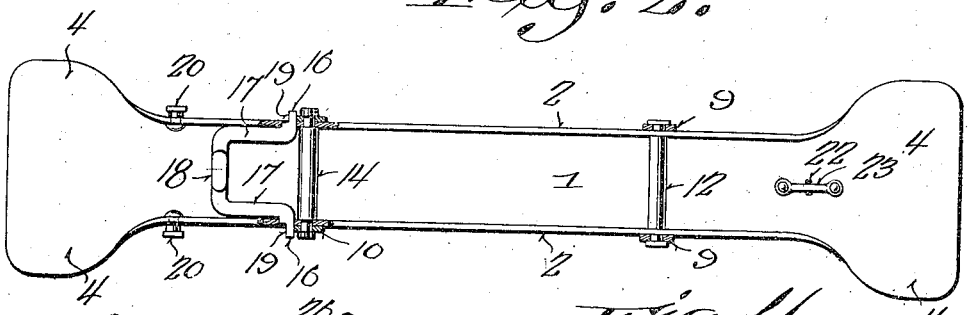
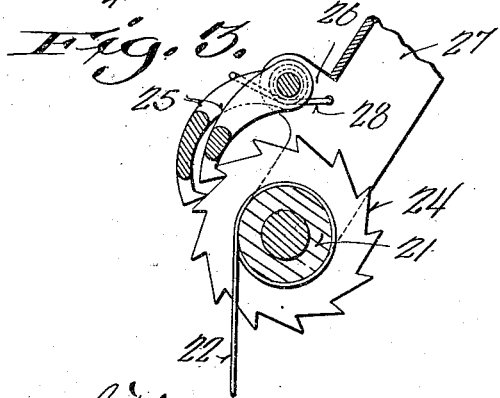
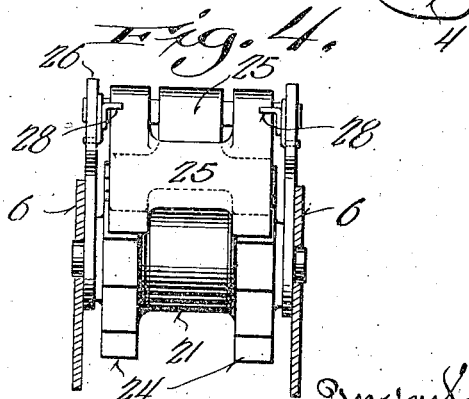

UNITED STATES PATENT OFFICE.

AUGUST STECKER, OF OSBORN, WISCONSIN.

VEHICLE LIFTING-JACK.

1,252,048.  Specification of Letters Patent.  Patented Jan. 1, 1918.

Application filed April 20, 1917. Serial No. 163,328.

*To all whom it may concern:*

Be it known that I, AUGUST STECKER, a citizen of the United States, and resident of Osborn, in the county of Clark and State of Wisconsin, have invented certain new and useful Improvements in Vehicle Lifting-Jacks; and I do hereby declare that the following is a full, clear, and exact description thereof.
My invention relates to new and useful improvements in vehicle lifting jacks, particularly those which are designed primarily for raising automobiles and similar motor vehicles.
With a very great majority of the lifting jacks in present day use it is impossible to operate the same unless the axle of the vehicle with which they are to be used is disposed a certain distance above the ground.
In other words if the wheels of the vehicle have sunk into mud-holes or other depressions in the road bed, such jacks are useless.

With this defect in view the principal object of the present invention has been to produce a jack which will effectively raise any vehicle even though its axle is disposed in very close proximity to the ground. My improved jack is therefore especially useful in raising vehicles when the wheels thereof have been caught in mud-holes in the road.

An additional object of the invention is to provide a jack of this character, the parts of which are so constructed and connected that they will readily fold when not in use so as to form a very compact article.

A still further object is to provide an improved means for elevating the end of the lifting member of the jack which is for engagement with the vehicle axle.
With the above and additional objects and advantages in view the invention resides in the novel features of construction, combination and arrangement of parts which will be hereinafter more particularly described and claimed.

In the accompanying drawing:

Figure 1 represents a side elevational view of a jack constructed in accordance with my invention, certain parts being shown broken away and in section;

Fig. 2 is a horizontal section on the plane of the line 2—2 of Fig. 1;

Fig. 3 is an enlarged detail sectional view through the cable carrying drum and the actuating means thereof; and Fig. 4 is an enlarged detail transverse section on the plane of the line 4—4 of Fig. 1.

Referring more particularly to the drawing, wherein the several figures illustrate the preferred embodiment of my invention, it will be seen that this improved jack comprises broadly a lifting member; a base, means for supporting the member above the base, and means connected with the base and one end of the lifting member for elevating the other end of the member.

Specifically the base 1 consists of a channeled metal plate having its flanges 2 disposed upwardly, its base 3 being adapted to rest upon the ground. As shown in Fig. 2 this base is relatively elongated and of sufficient length to afford a firm foundation for the parts supported thereby, the opposite ends of the flanges 2 being bent outwardly as at 4 into the plane of the bottom 3 to increase the ground engaging surface. The lifting member or lever 5 is also preferably formed from a channeled metal plate, the flanges 6 of which are disposed similarly to the flanges 2 of the base. The end of this lever which is to engage the axle A of a vehicle has the flanges 6 of that portion bent together and upon the base 7 of the plate and the whole bent to provide a hook 8 in which the axle is designed to seat.

This lever is fulcrumed intermediate its ends on the base 1 by means of two sets of links 9 and 10, one set being disposed on each side thereof. The upper ends of the links 9 and 10 of each set are pivoted as at 11 to each flange 6 of the lever, while the lower ends of the links 9 are similarly connected by the pin 12 through the flanges 2 of the base adjacent one end thereof. The lower ends of the links 10 are designed to be detachably connected with the flanges of the base whereby the lever may either be supported in operative position as shown in Fig. 1 or folded upon said base when inoperative. Said lever is of a width slightly less than the distance between the flanges 2 so that when the links 10 are disconnected it may nest in the base and thus occupy very little space.

To permit the links 10 to be detachably, yet securely held to the flanges 2, their lower ends are provided with longitudinally extending open end slots 13 for the reception of the outer ends of a pin 14 which extends between and projects through the flanges 2.

This pin is positioned a considerable distance from the pin 12, it preferably occupying the same position relative to the adjacent end of the base as said pin 12 occupies with respect to the opposite end. By this arrangement the lower ends of the links 9 and 10 are spaced apart and the lever is pivotally held in operative position. The ends of the links 10 adjacent the slots 14 are also provided with notches 15 which are formed in one edge and are adapted to receive the laterally extending arms 16 of cranks 17 when the latter, which are connected together as at 18, are disposed in one position. When the arms 16 and links are thus engaged the latter will be securely held in engagement with the ends of the pins 14 and prevented from being removed therefrom.

When, however, it is desired to fold the jack into inoperative position, the U-shaped locking member formed from the cranks 17 and connecting bar 18 is lifted from the position shown in Fig. 1 to dispose the cutaway portions 19 of the arms 16 so that the links may be moved past said arms and out of engagement with the pin 14. Upon this disengagement of the links 10 on the pin the lever is permitted to rest upon the base. It will be noted that the position of the cutaway portions 19 is such that the arms 16 will lock the links 10 when said member drops by gravity and rests upon the bottom 3 of the base as in Fig. 1.

Under some circumstances it might be necessary to or desirable to move the lever nearer to the base when in operative position on the base by disposing the links and the above mentioned or to position the hook end 8 slightly forward of the base. If such conditions arise the slotted ends of the links 10 may be removed from engagement with the pin 14 and disposed on the pins or rivets 20 which are secured in the flanges 2 at a point forwardly of the pin 14.

The preferred means for elevating the hooked end of the lever consists in pivoting a cable carrying drum 21 between the flanges 6 at the opposite end of the lever and providing a cable 22 for coöperation therewith. One end of this cable is secured to the base 1 by the eye 23, while the other end is wound around said drum in the usual manner. The opposite ends of this drum on the flanges thereof are provided with ratchet teeth 24 with which operating dogs 25 are designed to coact. These dogs are pivoted between ears 26 which extend from the channeled portions of an operating handle 27, a spring 28 also carried by said portions of the handle serving to force said dogs into engagement with the teeth. From Figs. 3 and 4 it will be noted that one of the dogs is disposed in advance of the other and that each dog engages both sets of ratchet teeth so that one will always be in a position to grip said teeth when the handle 27 is forced downwardly.

A pair of retaining dogs 29 similar in all respects to the dogs 25 are pivoted between the flanges 6 of the lever and are also forced into engagement with the teeth by means of a spring. The dogs 29 are designed to prevent retrograde movement of the cable carrying drum. Upon oscillation of the handle 27 which is pivoted upon the shaft carrying the drum, said drum will be caused to revolve and wind the cable 22 therearound, thus causing the hooked end of the lever to be elevated. When it is desired to lower said end of the lever the dogs may be released from engagement with the teeth. The handle being pivoted as shown in Fig. 1 may readily rock forwardly and be disposed in the channel of the lever 5, this position of the parts being usually assumed when the jack is to be folded into inoperative position as above described.

From the foregoing description it will be readily noted that a very simply constructed, yet a very strong jack has been produced which may be readily collapsed into a relatively small space when not in use. The provision of channeled parts permits the invention to be constructed of light sheet metal without materially reducing the strength thereof.

I claim:

1. In a jack of the class described, a support including a base, a lifting member, a connection between the lifting member and base, a link pivoted to the member at one end, the free end of the link having a longitudinally extending open end slot, a pin on the base to slidably receive the slotted end of the link, and means for holding said slotted end of the link on the pin against movement, and means for elevating one end of the lifting member.

2. In a jack of the class described, a support including a base, a lifting member, a connection between the lifting member and base, a link pivoted to the member adjacent one end, the free end of the link having an open end longitudinally extending slot, the end of the link adjacent the slot having a notch, a pin on the base to slidably receive the slotted end of the link, a pivoted locking member engageable with said notch to retain the link and pin in positive engagement, and means for elevating one end of the lifting member.

3. In a jack of the class described, a support including a base, a lifting member, a connection between the lifting member and base, a link pivoted to the member adjacent one end, the free end of the link having an open end longitudinally extending slot, the end of the link adjacent the slot having a notch, a pin on the base to slidably receive the slotted end of the link, a crank pivoted to the base, one arm of the crank being cutaway, said arm being engaged with the notch when the crank is disposed in one position, said link being movable past the cutaway portion when the crank is disposed in another position to permit the lifting member to be folded against the base, and means for elevating one end of the lifting member.

4. In a jack of the class described, a channeled base, a channeled lifting lever of less width than the base and adapted to rest therein, a pivoted supporting member between the base and lever to permit the latter to be moved into engagement with the former, means for elevating one end of the lever, and a handle for operating said means, said handle being pivoted to nest within the channeled lever when inoperative.

5. In a jack of the class described, a support including a base and means for mounting a lever thereon, a lever pivoted to the means and having a pair of spaced flanges, a drum pivoted between said flanges, each end of said drum having an annular flange provided with ratchet teeth, an operating handle having a pair of flanges adapted to straddle the drum and fulcrumed on the pivot shaft thereof, a pair of spaced ears on the handle, a pair of dogs pivoted between said ears, one dog being disposed in advance of the other and each being adapted to engage the teeth on both of said annular flanges, and a flexible member disposed around said drum and secured at one end to said base.

In testimony that I claim the foregoing I have hereunto set my hand at Chippewa Falls, in the county of Chippewa and State of Wisconsin.

AUGUST STECKER.

Copies of this patent may be obtained for five cents each, by addressing the "Commissioner of Patents, Washington, D. C."